United States Patent [19]

White, Jr. et al.

[11] 4,329,192
[45] May 11, 1982

[54] APPARATUS AND METHOD FOR MAKING A BELT CONSTRUCTION

[75] Inventors: Jack D. White, Jr., Springfield; Melvin D. Gayer, Everton, both of Mo.

[73] Assignee: Dayco Corporation, Dayton, Ohio

[21] Appl. No.: 226,285

[22] Filed: Jan. 19, 1981

[51] Int. Cl.³ ............................................. B29H 7/22
[52] U.S. Cl. ................................. 156/138; 51/103 R; 51/236; 156/154; 156/268; 156/457; 156/510; 264/162; 409/165
[58] Field of Search ............... 156/137, 138, 154, 457, 156/510, 257, 268; 264/150, 151, 159, 162; 51/103 R, 103 C, 103 WH, 236 R; 409/165, 166, 199, 161; 425/28 B; 29/414, 417, 557

[56] References Cited

U.S. PATENT DOCUMENTS

| | | | |
|---|---|---|---|
| 1,330,886 | 2/1920 | Macbeth et al. | 156/457 |
| 2,535,281 | 12/1950 | Glynn | 51/236 |
| 3,477,895 | 11/1969 | Sauer | 264/159 |
| 3,818,576 | 6/1974 | Braden et al. | 264/159 |
| 3,822,516 | 7/1974 | Huber | 51/326 |
| 4,231,826 | 11/1980 | Wrast et al. | 156/138 |

Primary Examiner—Michael W. Ball
Attorney, Agent, or Firm—Joseph V. Tassone

[57] ABSTRACT

An apparatus and method for making a belt construction having a plurality of alternating annular belt projections and grooves along its axial length are provided wherein the apparatus comprises an open ended building drum for building a tubular uncured structure, a curing device for curing the structure to define a belt sleeve, a cooling device for cooling the sleeve with the sleeve disposed around the drum, and a device for supporting and rotating the drum and sleeve to enable cutting thereof with a rotatable cutter wherein the supporting and rotating device comprises a plurality of rotatable support shafts including a driving shaft, with the shafts being adapted to be disposed within the hollow open ended drum and into pressure engagement against the inside surface thereof to support such drum, a drive for rotating the driving shaft with the shafts in pressure engagement against the inside surface to provide rotation of the drum and sleeve, and a cutter control apparatus for controlling the cutter during rotation of the cutter and drum to provide a cutting action which defines the belt construction having precisely made alternating projections and grooves.

26 Claims, 12 Drawing Figures

APPARATUS AND METHOD FOR MAKING A BELT CONSTRUCTION

BACKGROUND OF THE INVENTION

1. Field of the Invention

This invention relates to an apparatus and method for making a polymeric endless power transmission belt construction having a plurality of alternating annular belt projections and grooves along its axial length.

2. Prior Art Statement

In the making of a belt construction having a plurality of alternating annular belt projections and grooves along its axial length, it is common practice to cut a cured and cooled belt sleeve to define such construction while supporting the belt sleeve on a supporting mandrel having a central longitudinal axis and centers at its opposite ends which theoretically coincide with such central longitudinal axis. Such a supporting mandrel may be the usual essentially closed building drum employed to build up, cure, and cool the belt sleeve; or such supporting mandrel may be a separate component on which the cured and cooled sleeve is disposed after removal thereof from its building drum. In either event, the centers provided on such a supporting mandrel often have dimensional tolerance buildups which result in rotation of the sleeve, during cutting, in a path other than a right circular cylindrical path thereby the resulting belt construction has alternating belt projections and grooves defined therein which are not optimum precision.

The making of belt constructions of the character mentioned above from belt sleeves which are cut while rotating the sleeves on supporting mandrels essentially as described above are disclosed in the following:

(a) U.S. Pat. No. 3,891,405 wherein the cutting action is provided by a grinding wheel, and (b) copending U.S. patent application Ser. No. 267,189, filed May 26, 1981 wherein the cutting action is provided by rake-like cutting bars.

SUMMARY

It is a feature of this invention to provide an improved apparatus for making a belt construction having a plurality of alternating annular belt projections and grooves along its axial length with the apparatus comprising, a building drum for building a tubular uncured structure, means for curing the structure to define a belt sleeve, means for cooling the sleeve with the sleeve disposed around the drum, a device for supporting and rotating the drum and sleeve to enable cutting thereof, and a rotatable cutter for cutting the sleeve during rotation of the drum and sleeve.

For example, in accordance with one embodiment of this invention the building drum comprises; a tubular drum having a uniform wall thickness, a right circular cylindrical inside surface, and open ends; and the device comprises; a plurality of rotatable support shafts including a driving shaft with the shafts being adapted to be disposed within the hollow open ended drum and into pressure engagement against the inside surface thereof to support the drum, a drive for rotating the driving shaft with the shafts in pressure engagement against the inside surface to provide rotation of the drum and sleeve, and cutter control means for controlling the cutter during rotation of the cutter and drum to provide a cutting action which defines the belt construction having said alternating projections and grooves which are precisely made.

Another feature of this invention is to provide an improved method of making a belt construction which has a plurality of precisely made alternating annular belt projections and grooves along its axial length.

Therefore, it is an object of this invention to provide an improved apparatus and method for making a belt construction of the character mentioned having one or more of the novel features set forth above or hereinafter shown or described.

Other details, features, uses, objects, and advantages of this invention will become apparent from the embodiments thereof presented in the following specification, claims, and drawings.

BRIEF DESCRIPTION OF THE DRAWINGS

The accompanying drawings show present preferred embodiments of this invention, in which.

DETAILED DESCRIPTION

Figure 1:
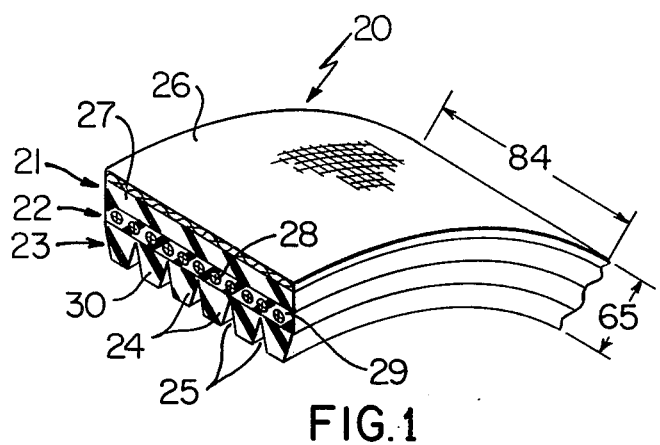
FIG. 1 is a isometric view with parts in elevation, parts in cross section, and parts broken away illustrating one exemplary embodiment of a polymeric endless power transmission belt construction made employing the apparatus and method of this invention.

Reference is now made to FIG. 1 of the drawings which illustrates one exemplary embodiment of a belt construction or belt made employing the apparatus and method of this invention and such belt is in the form of a polymeric endless power transmission belt which is designated generally by the reference numeral 20. The belt 20 is made primarily of polymeric material, preferably in the form of elastomeric material, and comprises a tension section 21, a load-carrying section 22, and a compression section 23. The compression section 23 has a plurality of alternating annular belt projections 24 and grooves 25 along its axial length with each projection 24 having an outer portion of truncated V-shaped or roughly trapezoidal configuration.

The belt 20 has an outer fabric layer 26 defining the outer portion of its tension section with the inner portion of such section being a polymeric layer in the form of a rubber compound 27. The load-carrying section 22 is comprised of a helically wound load-carrying cord 28, of any suitable type known in the art, and such cord is embedded in a highly resilient elastomeric material or gum cushion 29. Finally, the compression section 23 is comprised of a polymeric material, such as a rubber compound 30, and the grooves 25 in the outer portion thereof are V-shaped grooves made by cutting action.

Figure 3:
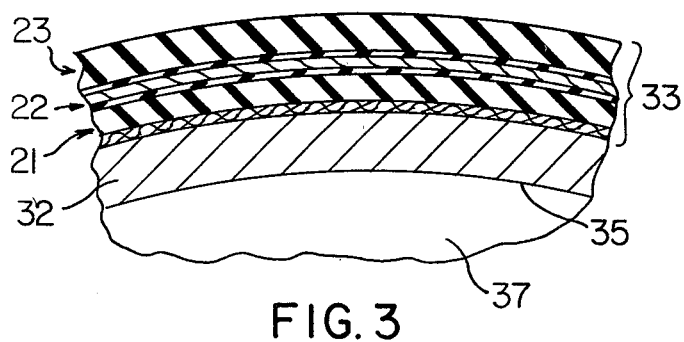
FIG. 3 is a fragmentary cross-sectional view illustrating completed method steps of building a tubular uncured structure around the drum and expanded mandrel of FIG. 2.
Figure 4:
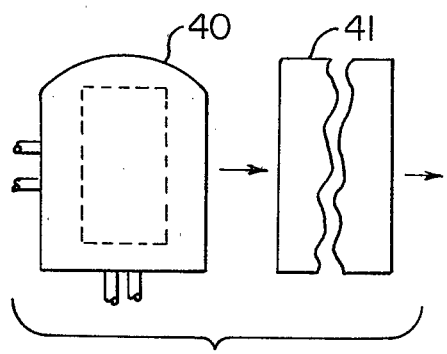
FIG. 4 is a schematic view illustrating the step of curing the uncured structure of FIG. 3 with the structure disposed around its drum to thereby define a belt sleeve and cooling such sleeve.
Figure 5:
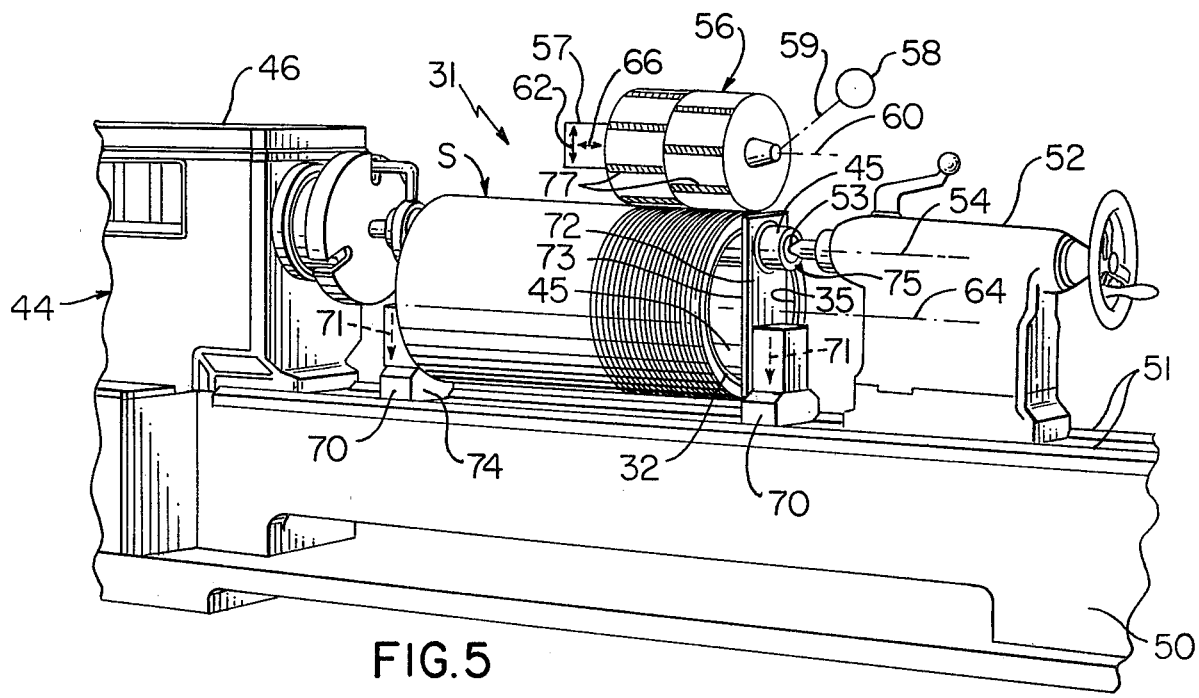
FIG. 5 is an isometric view, with parts broken away, of a device for supporting and rotating the open ended drum after curing and cooling the belt sleeve thereon and one exemplary embodiment of a rotatable cutter for cutting the sleeve during rotation of the drum and sleeve.

The apparatus of this invention is illustrated in FIGS. 2 through 9 and will be designated generally by the reference numeral 31 in FIG. 5. The apparatus 31, comprises a drum 32 (FIG. 2) for building a tubular uncured structure and such tubular uncured structure is designated generally by the reference numeral 33 in FIG. 3 of the drawings. The building drum 32 is a tubular drum (FIG. 2) and has a uniform wall thickness 34, a right circular cylindrical inside surface 35, and open ends as shown at 36 for a typical open end.

The drum 32 is preferably made of a high strength material which is capable of withstanding the various temperatures, pressures, and process steps required in making a belt construction having alternating annular projections and grooves along its length. The drum 32 is preferably made of a high strength metal, such as, an aluminous metal or a ferrous metal.

Figure 2:
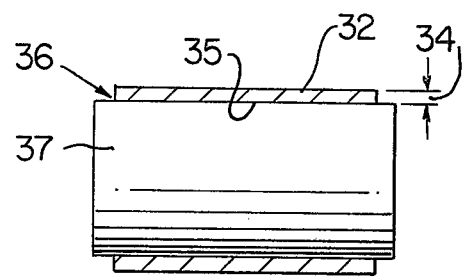
FIG. 2 is a view illustrating an expandable mandrel disposed within an open ended tubular drum comprising the apparatus and used in the method of this invention.

The apparatus of this invention also comprises an expandable mandrel 37, which is illustrated schematically in FIG. 2 as a cylindrical body. The mandrel 37 may be of any suitable type known in the art and may employ mechanical means, fluid means, or both to provide expansion and collapsing thereof. The expandable mandrel is such that it is easily installed within the open-ended drum 32 and expanded to support same against collapse during the buildup, curing, and cooling of the belt sleeve S to be defined thereon and once such sleeve is made and cooled the mandrel 37 is easily collapsed and removed from within the drum 32.

Figure 6:
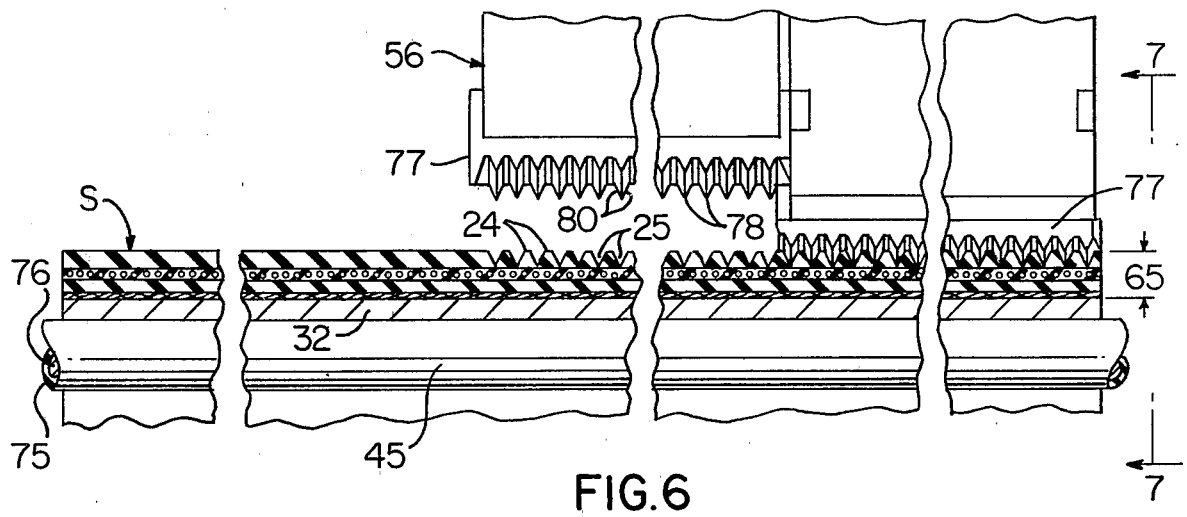
FIG. 6 is a view with parts in elevation, parts in cross section, and parts broken away particularly illustrating the cured and cooled sleeve during cutting of one end portion thereof.

The apparatus 31 comprises means for curing the structure 33 to define a belt sleeve S, shown in FIGS. 5 and 6, and such curing means is in the form of a curing device 40 which is illustrated schematically in FIG. 4. The curing device 40 may be of any suitable type and may comprise a pot heater which employs steam for curing purposes.

The apparatus 31 also comprises means for cooling the sleeve S with the sleeve disposed around its drum 32 and such cooling means is designated generally by the reference numeral 41 in FIG. 4. The cooling means 41 may be any suitable cooling apparatus employed in the art of making power transmission belts and may consist of a tank or reservoir containing a volume of recirculating cold tap water and means for immersing the sleeve S and its drum 32 within the cold water for cooling purposes.

The apparatus 31 comprises a device for supporting and rotating the drum and sleeve to enable cutting thereof and such device is illustrated in FIG. 5 of the drawings and designated generally by the reference numeral 44 and comprises a modified lathe structure 44. The device 44 comprises a plurality of rotatable support shafts, including a driving shaft, and each shaft is designated by the same reference numeral 45 and the shafts are adapted to be disposed within the hollow open ended drum 32 and into pressure engagement against the inside surface 35 of such drum 32 to support same.

The device 44 also comprises a drive, shown as a drive head assembly 46, and is provided for rotating at least one of the shafts 45. In this example of the invention, the drive 46 is provided for supporting and rotating the top support shaft 45, as viewed in FIG. 5 of the drawings, whereby such top shaft may be considered the drum driving shaft 45.

The drive head assembly or drive 46 of this example is shown as a modified head stock 46 of the lathe structure 44 and such lathe structure comprises a support body 50 which has the head stock 46 provided at one end thereof and horizontal ways 51 on the support body 50. The device 44 or modified lathe structure also has a tail stock 52 slidably carried on the ways 51 and the tail stock 52 has a center 53 which cooperates with the head stock or head assembly 46 to support the driving shaft about a fixed reference axis 54. Also, and as is known in the metal working art, the head stock 46 and tail stock 52 cooperate to enable rotation of the driving shaft 45 about its reference axis 54.

The apparatus 31 also comprises a cutter 56 and cutter control means, illustrated schematically and designated generally by the reference numeral 57, for controlling the cutter 56 during rotation thereof and during rotation of the drum 32 to provide a cutting action which defines the belt construction or belt 20 having the alternating projections 24 and grooves 25 which are precisely made to exact dimensions.

The cutter 56 will be described in more detail subsequently; however, such cutter is preferably driven by an electric motor 58 through a suitable mechanical connection 59, which is indicated schematically by dot-dash lines, to provide rotation of the cutter about the longitudinal axis 60 of the cutter.

Figure 8:
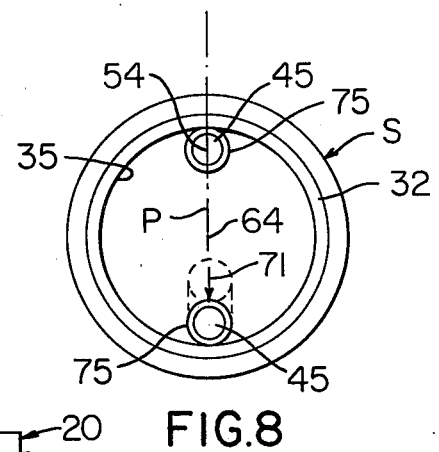
FIG. 8 is an end view of a portion of the device of FIG. 5 which is used for supporting and rotating the drum and cured sleeve and illustrating that such device comprises a pair of support shafts.

The cutter control means 57 comprises means 62 (designated by a double arrow, for supporting and urging the cutter 56 toward and away from the sleeve S and such sleeve is at a location where the drum 32 and sleeve S are backed by the driving shaft 45 (which is supported for rotation about the fixed reference axis 54) so that the reference axis 54, the longitudinal axis 60 of the cutter 56, and the longitudinal axis 64 of the drum 32 and sleeve S are disposed in a common plane, and such plane, in this example, is a vertical plane which is indicated by dot dash lines in FIG. 8 and designated by the reference letter P. The cutter 56 is adapted to be moved by its supporting and urging means 62 to an innermost position to cut the sleeve S and define the belt construction 20 having alternating projections and grooves which are precisely made due to the comparatively small dimensional tolerance buildup encountered in precisely rotating the drum 32 and sleeve by supporting the inside surface 35 of drum 32 directly around and against the top driving shaft 45. Thus, the cutting action takes place with cutting forces being exerted substantially in the common plane P and with the axes 60, 54, and 64 of the cutter 56, backup shaft 45, and drum 32 respectively being in such plane. Also, it is a comparatively simple matter to keep the axes 60 and 54 parallel to provide precise cutting.

The plurality of rotatable support shafts 45 in the illustration of FIG. 5 consist of a plurality of two rotatable support shafts disposed in the above-mentioned vertical plane P, and as will be readily apparent from FIGS. 5 and 8. The driving shaft 45 is disposed in vertically aligned relation over the other of the support shafts 45 whereby such shafts are 180° apart. Also, the means for supporting and urging the cutter 56 comprises the above-mentioned means 62 for supporting and urging the cutter vertically against the sleeve. The means 62 also comprises means for retracting the cutter 56 completely away from the sleeve S after movement thereof to the innermost position where the projections 24 and groove 25 are finally defined. The means 62 comprises an integral stop (not shown) which enables the cutter 56 to be urged toward and into the sleeve S so that once such stop is engaged, the precise overall thickness 65 of the belt construction 20 (FIGS. 1 and 6) is defined; and, this is due to the fact that the cutter 56 is constructed such that it provides the cutting of the sleeve S until the above-mentioned integral stop is engaged whereupon the desired amount of material has been removed from the compression section defining portion of such sleeve.

The cutter control means 57 also comprises means 66 (also designated by a double arrow) for moving the cutter 56 axially along the drum 32 and sleeve S to enable precise cutting of the sleeve across its entire axial length. It will be appreciated that the moving means 66 is employed to precisely position the cutter 56 initially and then to index such cutter axially after retraction thereof from the sleeve S once a cut has been made therein. The means 62 and 66 utilize suitable mechanisms and controls of any type known in the art.

The apparatus 31 also comprises means, shown as a pair of mechanisms each designated by the same reference numeral 70 in FIG. 5, for urging the shafts 45 into pressure engagement against the inside surface 35 of the drum 32. Each mechanism 70 is provided at an associated end of the lower shaft 45; and, each mechanism 70 has suitable spring means designated by an arrow 71 for engaging and yieldingly urging its shaft end radially outwardly away from the longitudinal axis 64 of the drum 32. By urging the bottom or lowermost shaft 45 radially outwardly, it will be appreciated that both the upper and the lower shafts 45 are, in essence, urged against the inside surface 35 of the drum 32 inasmuch as the upper driving shaft 45 is held with its axis 54 in a stationary position and the drum 32 is supported by the driving shaft.

The apparatus 31 is also provided with suitable means for restraining the drum 32 and its sleeve S against axial movement during the cutting of such sleeve. In this example of the invention, such means comprises a vertically disposed plate 72 suitable fixed to one end (right end as viewed in FIG. 5) of an immediately adjacent mechanism 70; and, the plate 72 has an antifriction surface 73 which is adapted to engage an associated smooth metal end edge of the drum 32 and prevent movement of each drum to the right, as viewed in FIG. 5. The restraining means for the drum 32 and sleeve S also comprises means at the opposite end of the drum 32, shown as the left end in FIG. 5, and such means comprises an antifriction surface 74 provided on the left mechanism 70. The surface 74 is also adapted to engage an associated smooth metal end edge of the drum 32.

In this example, the drum 32 is confined axially by the antifriction surfaces 73 and 74; however, it is to be understood that other restraining means may be provided for this purpose. For example, an annular projection, or the like, may be provided on at least one of the shafts 45 and a cooperating groove in the tubular drum 32 which receives such annular projection and restrains the drum 32 against axial movement.

Each of the rotatable support shafts 45 has an outer portion or layer 75 made of a friction material which engages the inside surface 35 of the drum 32 and assures non-slipping rotation of such drum 32 relative to the support shafts 45. The outer layer 75 is preferably a yieldable yet resilient polymeric material which may be a synthetic plastic or a suitable rubber. FIG. 6 of the drawings illustrates a typical shaft 45, shown as the driving shaft, which has a solid central portion 76 made of a metallic material and its outer layer 75 made of a rubber compound.

The building of the tubular structure 33 illustrated in FIG. 3 of the drawing is achieved utilizing techniques which are known in the art and comprises the method steps of wrapping uncured material around the drum 32 (with the drum supported by mandrel 37) to define the inner tension section defining portion 21 of the structure, central load-carrying section defining portion 22 of the structure, and outer compression section defining portion 23 of the structure. The same reference numerals 21, 22, and 23 have been used to designate the uncured belt defining sections of the uncured structure 33 as were used in the completed belt construction 20, for simplicity. It will also be appreciated that the building of the uncured tubular structure 33 may be modified using techniques and component portions, as known in the art, to define an uncured sleeve similar to the sleeve 33 yet which employs various layers, components, and the like, designed to give the resulting belt construction special performance characteristics.

Figure 7:
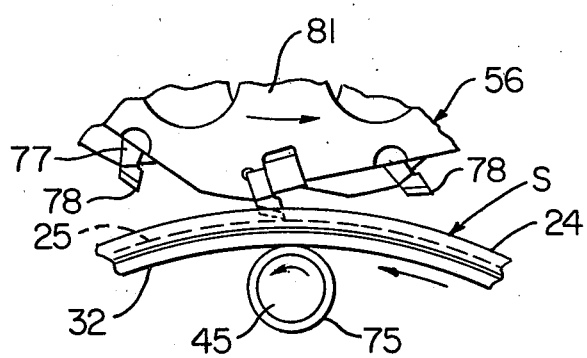
FIG. 7 is a view particularly illustrating a fragmentary portion of the cutter of FIG. 6 to show the plurality of rake-like cutting bars comprising such cutter.

The cutting of the sleeve S is preferably achieved utilizing the cutter 56 illustrated in FIGS. 5 and 6 and such cutter 56 is comprised of at least one rake-like metal cutting bar and preferably a plurality of such cutting bars, with each cutting bar being designated by the same reference numeral 77, FIGS. 6 and 7. Each cutting bar 77 has an elongate axis and integral spaced parallel teeth 78 which define cutting projections. The cutting projections or teeth are made of a suitable cutting tool metal, or the like, and are disposed perpendicular to the elongate axis of their associated bar 77. Each of the teeth has integral knife-like cutting edges 80 defining opposite sides thereof and the teeth cooperate to define the alternating projections 24 and grooves 25 along the axial length of the belt construction 20.

The cutter 56 illustrated in FIGS. 5 and 6 is presented in detail in the above-mentioned copending U.S. patent application Ser. No. 267,189, filed May 26, 1981. The cutting bars 77 are supported on a support 81 therefor, as shown in FIG. 7, and all cutting bars 77 of the cutter 56 cooperate so that the teeth 78 thereof define the alternating projections 24 and grooves 25 along the axial length of the belt construction 20. It will be appreciated that in the usual application, the sleeve S has an axial length which is several times greater than the axial length of the cutter 56 whereby it is necessary to index the cutter 56 along the sleeve employing means 66 and then provide a cutting action employing means 62 of the cutter control means 57, as described earlier, to provide the alternating projections 24 and grooves 25 along the entire axial length of the sleeve. As seen in FIG. 7, during the cutting of such projections 24 and grooves 25, the drum 32 is rotated counterclockwise by the head assembly 46 rotating the driving shaft 45 and the cutter 56 is rotated counterclockwise by its motor 58.

Figure 9:
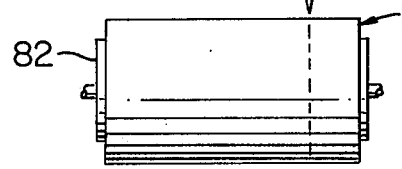
FIG. 9 is a schematic view particularly illustrating the further cutting of the belt construction after cutting the alternating annular projections and grooves along its axial length to define a plurality of belt constructions essentially identical to the belt construction illustrated in FIG. 1.

The resulting construction with alternating projections and grooves along its entire axial lengths is also designated by the reference numeral 20 and is shown removed from its drum and disposed on a special cutting mandrel 82 in FIG. 9 where it is cut with a knife-like cutter 83 to define a plurality of individual belts or belt constructions which are identical to the belt 20 of FIG. 1 and each has the same width 84 as the belt of FIG. 1.

Instead of removing the construction 20 from its tubular drum 32 to enable cutting as shown in FIG. 9, the mandrel 32 may be provided with a special expendable dimensionally stable backup pad, or the like, enabling the build-up of the belt sleeve against the outside surface of such a backup pad. The cutting of belts or belt constructions having individual widths 84 may be achieved by swinging the cutter 56 out of position, rotating the belt construction 20 employing the device 44 of FIG. 5, and using the knife-like cutter 83 to cut belts 20 each having a width 84.

In the disclosure presented in FIG. 5, the device 44 is shown utilizing a plurality of two rotatable support shafts 45 and associated mechanisms 70 having spring means 71 for yieldingly urging the shafts 45 against the inside surface 35 of the drum 32 and as highlighted schematically in FIG. 8. The two support shafts 45 are disposed 180° apart, as mentioned earlier.

Figure 10:
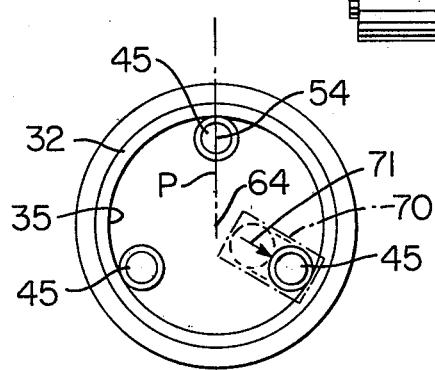
FIG. 10 is a view similar to FIG. 8 illustrating a modification of the device for supporting and rotating the drum and sleeve wherein such modified device comprises a plurality of three support shafts.

However, it will be appreciated that the device 44 may utilize a plurality of three rotatable support shafts 45, as illustrated in FIG. 10 of the drawings, disposed in angularly spaced relation of approximately 120°. The device 44 of FIG. 10 also preferably has the axis 60 of the cutter 56 in a common plane P with the axis 54 of the driving shaft 45 and the axis 64 of the drum 32 and such common plane P is shown as a vertical plane. The modification of FIG. 10 also utilizes urging means comprising a pair of urging mechanisms 70 each including spring means 71. The pair of mechanisms 70 are used in association with one of the support shafts 45 and serve to urge the three shafts 45 into pressure engagement against the inside surface 35 of the drum 32 in a similar manner as previously described, for the two shafts 45.

Figure 11:
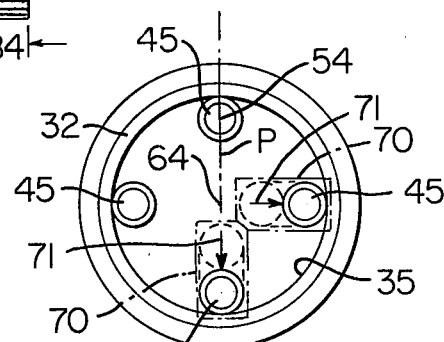
FIG. 11 is a view similar to FIG. 8 illustrating another modification of the device for supporting and rotating the drum and sleeve wherein such modified device comprises a plurality of four support shafts.

The device 44 may utilize a plurality of four rotatable support shafts 45, as illustrated in FIG. 11. The shafts of FIG. 4 are disposed in angularly spaced relation of approximately 90°. In a similar manner as described in connection with the presentations of FIGS. 8 and 10, the device 44 of FIG. 11 also preferably has the axis 60 of the cutter in a common plane P with the axis 54 of the driving shaft 45 and the axis 64 of the drum 32 and such plane P is again shown as a vertical plane. In the modification of FIG. 11, two of the lower shafts 45 have mechanisms 70 including spring means 71. The mechanisms 70 urge their two shafts 45 radially outwardly from axis 64 and serve to urge the four shafts 45 into pressure engagement against the inside surface 35 of the drum 32 in a similar manner as previously described and for the same purposes.

The cutter 56 is illustrated in FIGS. 5–7 as being of a particular type which has rake-like cutting bars as described. However, it will be appreciated that such cutter may be in the form of a grinder which is also designated by the reference numeral 56 in FIG. 12 of the drawings. The grinder 56 has a contoured grinding wheel W which is provided with alternating grooves and projections which cooperate to define the alternating annular belt projections 24 and grooves 25 respectively of the belt construction 20. For simplicity, the grinder 56 of FIG. 12 is shown engaging the sleeve S with such sleeve supported on its open ended drum and without illustrating the support shafts 45 and mechanisms 70.

The mechanisms 70 are shown in the presentation of FIG. 5 as being supported on the ways 51 and it will be appreciated that such mechanisms are slideable along such ways and have means for detachably fastening same at any desired position therealong. Further, the plate 72 has a substantial opening in the top portion thereof which allows the driving shaft 45 to be extended therethrough in a non-contacting manner. Also, another plate, similar to the plate 72, may be provided for the same purposes and suitably fastened to the mechanism 70 which is disposed at the left end of the drum 32, as shown in FIG. 5.

Figure 12:
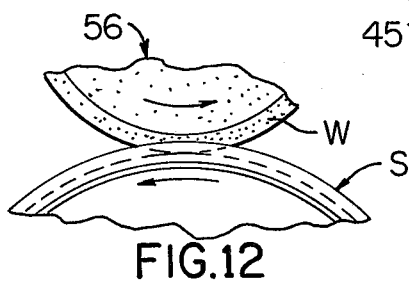
FIG. 12 is a view similar to FIG. 7 which illustrates a modified cutter of the apparatus which is defined in the form of a grinding wheel.

It will also be appreciated that the mechanisms 70 utilized in association with the plurality of shafts 45 as illustrated in FIGS. 11 and 12 are also suitably detachably fastened in position and special brackets, support mechanisms, and the like may be provided to enable such mechanisms to be detachably fastened and supported on the ways 51.

It will also be understood that special fixtures may be provided to facilitate insertion of the two, three, four, or any desired number of shafts 45 within an associated drum 32 to be rotated by device 44.

Each fixture may have suitable means enabling easy insertion and disposal of its shafts 45 in position within a drum 32 and once such shafts are thus disposed each fixture may have suitable means enabling easy handling, transfer, and supporting on the device 44 to enable cutting of the associated sleeve S. Each fixture may also have the desired mechanisms 70 provided therewith and suitable means for precisely positioning the shafts with the desired angular displacement.

The projections 24 of the belt construction 20 have been illustrated and described herein as being trapezoidal or of a truncated V-shaped configuration. However, it will be appreciated that such projections may be V-shaped or have other suitable configurations utilized in power transmission belts which have longitudinal ribs extending therealong.

The drum 32 and its sleeve may be rotated by the device 44 at various rotational speeds and either cutter 56 (of FIGS. 7 or 12) is usually rotated at a high rotational speed (as known in the art) when compared to the rotational speed of the drum 32 and sleeve S.

While present exemplary embodiments of this invention, and methods of practicing the same, have been illustrated and described, it will be recognized that this invention may be otherwise variously embodied and practiced within the scope of the following claims.

What is claimed is:

1. In a method for making a belt construction having a plurality of alternating annular belt projections and grooves along its axial length; said method comprising the steps of; building a tubular uncured structure around a building drum which has a central longitudinal axis; curing said structure to define a belt sleeve; cooling said sleeve with said sleeve disposed around said drum; supporting and rotating said drum and sleeve on a device to enable cutting thereof; and cutting said sleeve with a rotatable cutter which has a central longitudinal axis and during rotation of said drum and sleeve; the improvement in said method wherein said building step comprises; building said structure around a tubular drum having a uniform wall thickness, a right circular cylindrical inside surface, and open ends; and said supporting and rotating step comprises supporting said drum and sleeve on said device which comprises a plurality of rotatable support shafts including a driving shaft by disposing said shafts within said hollow open ended drum and into pressure engagement against said inside surface to support said drum, the axes of the support shafts being spaced from the axis of the drum, rotating said driving shaft with a drive and with said shafts in pressure engagement against said inside surface to provide rotation of said drum and sleeve, and controlling said cutter with cutter control means during rotation of said cutter and drum to provide a cutting action which defines said belt construction having said alternating projections and grooves which are precisely made.

2. A method as set forth in claim 1 in which said cutter control means comprises means for supporting and urging said cutter into said sleeve at a location where the drum and sleeve are backed by one of said shafts which is supported for rotation about a fixed reference axis so that said reference axis and longitudinal axes are disposed in a common plane, and said cutting step comprises moving said cutter with said supporting and urging means to its innermost cutting position to cut said sleeve and define said belt construction having said precisely made projections and grooves due to the comparatively small dimensional tolerance buildup encountered in rotating said drum and sleeve by supporting said inside surface directly against said one shaft.

3. A method as set forth in claim 2 in which said driving shaft and said one shaft are one and the same, said cutter control means comprises means for moving said cutter axially along said drum and sleeve, and said method comprises the further steps of retracting said cutter completely away from said sleeve after movement thereof to said innermost position, moving said cutter axially along said sleeve employing said moving means, and again moving said cutter with said supporting and urging means to its innermost cutting position.

4. A method as set forth in claim 3 and comprising the further step of restraining said drum and sleeve against axial movement during cutting of said sleeve.

5. A method as set forth in claim 4 in which cutting step comprises cutting said sleeve with said cutter comprising at least one rake-like cutting bar which has an elongate axis and integral spaced parallel teeth which define cutting projections and are disposed perpendicular to its elongate axis, each of said teeth having integral knife-like cutting edges defining opposite sides thereof, said teeth cooperating to define said alternating projections and grooves along the axial length of said belt construction.

6. A method as set forth in claim 4 in which said cutting step comprises cutting said sleeve with said cutter comprising a contoured grinding wheel having alternating grooves and projections which cooperate to define said alternating annular belt projections and grooves respectively along the axial length of said belt construction.

7. A method as set forth in claim 6 in which said building step comprises building said structure around said drum made of a high strength metal.

8. A method as set forth in claim 7 in which said supporting and rotating step comprises supporting said drum on said plurality of support shafts each having an outer layer made of a friction material which frictionally engages said inside surface and assures nonslipping rotation of said drum relative to said shafts.

9. A method as set forth in claim 8 in which said supporting and rotating step comprises supporting and rotating said drum employing a plurality of two rotatable support shafts disposed 180° apart.

10. A method as set forth in claim 8 in which said supporting and rotating step comprises supporting and rotating said drum employing a plurality of three rotatable support shafts disposed in angularly spaced relation of approximately 120° apart.

11. A method as set forth in claim 8 in which said supporting and rotating step comprises supporting and rotating said drum employing a plurality of four rotatable support shafts disposed in angularly spaced relation of approximately 90° apart.

12. In an apparatus for making a belt construction having a plurality of alternating annular belt projections and grooves along its axial length; said apparatus comprising; a building drum for building a tubular uncured structure, said building drum having a central longitudinal axis; means for curing said structure to define a belt sleeve; means for cooling said sleeve with said sleeve disposed around said drum; a device for supporting and rotating said drum and sleeve to enable cutting thereof; and a rotatable cutter for cutting said sleeve during rotation of said drum and sleeve, said cutter having a central longitudinal axis; the improvement in said apparatus wherein said building drum comprises; a tubular drum having a uniform wall thickness, a right circular cylindrical inside surface, and open ends; and said device comprises; a plurality of rotatable support shafts including a driving shaft, said shafts being adapted to be disposed within said hollow open ended drum and into pressure engagement against said inside surface to support said drum, the axes of the support shafts being spaced from the axis of the drum, a drive for rotating said driving shaft with said shafts in pressure engagement against said inside surface to provide rotation of said drum and sleeve, and cutter control means for controlling said cutter during rotation of said cutter and drum to provide a cutting action which defines said belt construction having said alternating projections and grooves which are precisely made.

13. An apparatus as set forth in claim 12 in which said cutter control means comprises means for supporting and urging said cutter toward and away from said sleeve and into said sleeve at a location where the drum and sleeve are backed by one of said shafts which is supported for rotation about a fixed reference axis so that said reference axis and longitudinal axes are disposed in a common plane, said cutter being adapted to be moved by said supporting and urging means to its innermost cutting position to cut said sleeve and define said belt construction having said precise dimensions due to the comparatively small dimensional tolerance buildup encountered in rotating said drum and sleeve by supporting said inside surface directly against said one shaft.

14. An apparatus as set forth in claim 13 in which said driving shaft and said one shaft are one and the same.

15. An apparatus as set forth in claim 14 in which said cutter control means also comprises means for moving said cutter axially along said drum and sleeve to enable precise cutting of said sleeve across its entire axial length.

16. An apparatus as set forth in claim 15 and further comprising means for restraining said drum and sleeve against axial movement during cutting of said sleeve.

17. An apparatus as set forth in claim 16 in which said cutter comprises at least one rake-like cutting bar which has an elongate axis and integral spaced parallel teeth which define cutting projections and are disposed perpendicular to its elongate axis, each of said teeth having integral knife-like cutting edges defining opposite sides thereof, said teeth cooperating to define said alternating projections and grooves along the axial length of said belt construction.

18. An apparatus as set forth in claim 17 in which said cutter comprises at least another rake-like cutting bar which is substantially identical to said one rake-like cutting bar, said rake-like cutting bars being supported on a support in parallel spaced relation about said central longitudinal axis of said cutter, said cutting bars cooperating so that the teeth thereof define said alternating projections and grooves of said belt construction.

19. An apparatus as set forth in claim 16 in which said cutter comprises a contoured grinding wheel having alternating grooves and projections which cooperate to define said alternating annular belt projections and grooves respectively along the axial length of said belt construction.

20. An apparatus as set forth in claim 16 in which said tubular drum is made of a high strength ferrous metal.

21. An apparatus as set forth in claim 16 in which said tubular drum is made of a high strength aluminous metal.

22. An apparatus as set forth in claim 16 in which each of said rotatable support shafts has an outer layer made of a friction material which frictionally engages said inside surface and assures nonslipping rotation of said drum relative to said shafts.

23. An apparatus as set forth in claim 22 in which said outer layer is made of a yieldable yet resilient polymeric material.

24. An apparatus as set forth in claim 16 in which said plurality of rotatable support shafts consists of a plurality of two rotatable support shafts, said common plane is a vertical plane, and said driving shaft is disposed in vertically aligned relation above the other of said support shafts.

25. An apparatus as set forth in claim 16 in which, said plurality of rotatable support shafts consists of a plurality of three rotatable support shafts disposed in angularly spaced relation of approximately 120°.

26. An apparatus as set forth in claim 16 in which, said plurality of rotatable support shafts consists of a plurality of four rotatable support shafts disposed in angularly spaced relation of approximately 90°.

* * * * *